United States Patent [19]

Chamberlain et al.

[11] Patent Number: 5,177,155
[45] Date of Patent: Jan. 5, 1993

[54] SELECTIVE HYDROGENATION OF CONJUGATION DIOLEFIN POLYMERS WITH RARE EARTH CATALYSTS

[75] Inventors: Linda R. Chamberlain, Richmond; Carma J. Gibler, Houston; Richard A. Kemp, Stafford; Stanley E. Wilson; Thomas F. Brownscombe, both of Houston, all of Tex.

[73] Assignee: Shell Oil Company

[21] Appl. No.: 699,028

[22] Filed: May 13, 1991

[51] Int. Cl.$^5$ ............................................. C08F 8/04
[52] U.S. Cl. .................................... 525/338; 525/332.8; 525/332.9; 525/333.1; 525/333.2; 525/339
[58] Field of Search .................................. 528/338, 339

[56] References Cited

U.S. PATENT DOCUMENTS

| | | | |
|---|---|---|---|
| Re. 27,145 | 6/1971 | Jones | 260/880 |
| 3,032,569 | 5/1962 | Freeman et al. | 260/429 |
| 3,494,942 | 2/1970 | Miki et al. | 260/397.5 |
| 3,634,594 | 8/1970 | Hiyama et al. | 84/1.1 |
| 3,670,054 | 6/1972 | De La Mare et al. | 260/880 B |
| 3,700,633 | 10/1972 | Wald et al. | 260/880 B |
| 4,501,857 | 2/1985 | Kishimoto et al. | 525/338 |
| 4,668,773 | 5/1987 | Marks et al. | 534/15 |
| 4,673,714 | 6/1987 | Kishimoto et al. | 525/314 |
| 4,716,257 | 12/1987 | Marks et al. | 585/275 |
| 4,801,666 | 1/1989 | Marks et al. | 526/123 |
| 4,845,201 | 7/1989 | Chauvin et al. | 534/15 |
| 4,929,699 | 5/1990 | Wilson et al. | 525/339 |

FOREIGN PATENT DOCUMENTS 0339986 4/1989 European Pat. Off. .

OTHER PUBLICATIONS

"Highly Reactive Organolanthanides" by Jeske et al., Journal of American Chemical Society, 1985, vol. 107. Advances in Organometallic Chemistry edited by Stone and West, vol. 24, published in 1985 by Academic Press Inc., pp. 131–177.

Primary Examiner—Bernard Lipman

[57] ABSTRACT

This invention provides a catalyst and a process for the hydrogenation of conjugated diolefin polymers which first involves the polymerization or copolymerization of such monomers with an organo alkali metal polymerization initiator in a suitable solvent thereby creating a living polymer. The living polymer can be terminated by the addition of hydrogen. Finally, selective hydrogenation of the unsaturable double bonds in the conjugated diolefin units of the terminated polymer is carried out in the presence of an initiator and at least one rare earth compound of the formula $$*CpMR$$

where $*Cp$ is pentamethylcyclopentadiene, M is a rare earth element and R is alkyl, aryl, aralkyl or hydrogen.

20 Claims, No Drawings

SELECTIVE HYDROGENATION OF CONJUGATION DIOLEFIN POLYMERS WITH RARE EARTH CATALYSTS

BACKGROUND OF THE INVENTION

The present invention relates to a process for the production of selectively hydrogenated polymers of conjugated dienes and more particularly to such a process utilizing rare earth element hydrogenation catalysts.

The hydrogenation or selective hydrogenation of conjugated diene polymers has been accomplished using any of the several hydrogenation processes known in the prior art. For example the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the methods described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

In 1985, Kishimoto et al. disclosed (in U.S. Pat. No. 4,501,857) that selective hydrogenation of the unsaturated double bonds in conjugated diolefin polymers could be achieved by hydrogenating such polymers in the presence of at least one bis-cyclopentadienyl)-titanium (+4) compound and at least one hydrocarbon lithium compound wherein the hydrocarbon lithium compound can be an added compound or a living polymer having a lithium atom in the polymer chain. European patent application 0,339,986 discloses that this can be accomplished with the same titanium (+4) compounds in combination with an alkoxy lithium compound which can either be added directly or as a reaction mixture of an organic lithium compound with an alcoholic or phenolic compound. In U.S. Pat. No. 4,673,714, bis(cyclopentadienyl)titanium (+4) compounds were disclosed which preferentially hydrogenate the unsaturated double bonds of conjugated diolefins but do not require the use of an alkyl lithium compound.

SUMMARY OF THE INVENTION

The present invention provides a catalyst and a process for the hydrogenation of conjugated diolefin polymers, especially copolymers thereof with alkenyl aromatic hydrocarbons, which first involves the polymerization or copolymerization of such monomers with an organo alkali metal polymerization initiator in a suitable solvent thereby creating a living polymer. The living polymer may or may not be terminated by the addition of hydrogen or alcohols, carboxylic acids, amines, hydrocarbons, etc. Finally, selective hydrogenation of the unsaturated double bonds in the conjugated diolefin units of the terminated polymer is carried out in the presence of an initiator and at least one rare earth element compound of the formula $$*Cp_2MR$$

where $*Cp$ is pentamethylcyclopentadiene, M is a rare earth element and R is alkyl, aryl, aralykl or hydrogen.

As the terminology is used herein, the "rare earth" elements are those of atomic numbers 21, 39 and 57 through 71; elements of the "lanthanum series" are those of atomic numbers 57 through 71; the "lanthanide" elements are those of atomic numbers 58 through 71. Traditionally, the lanthanum series has further been divided into the "cerium earth" group of atomic numbers 57 through 62, the "terbium earth" group of atomic numbers 63 through 66, and the "yttrium earth" group of atomic numbers 67 through 71 (so named not because yttrium is a member of the group, but because yttrium is found with these elements in nature).

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as lithium, sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly haloganated aromatic hydrocarbons, such as chlorobenzene, chlorotuluene and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in tee present invention include those which may be represented by the general formula:

$$A_z-(B-A)_y-B_x$$

Wherein:

A is a linear or branched polymeric block comprising predominantly monoalkenyl aromatic hydrocarbon monomer units;

B is a linear or branched polymeric block containing predominantly conjugated diolefin monomer units;

x and z are, independently, a number equal to 0 or 1;

y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]hd\ n-C-P_{n'}$$

Wherein:

A, B, x, y and z are as previously defined; n and n' are, independently, numbers from 1 to about 100 such that $n + n' \geq 3$;

C is the core of the coupled or radial polymer formed with a polyfunctional coupling agent; and Each P is the same or a different polymer block or polymer segment having the general formula:

$$B'_{x'}-(A'-B'')_{y'}-A''_{z'}$$

Wherein:

A" is a polymer block containing predominantly monoalkenyl aromatic hydrocarbon monomer units;

B' is a polymer block containing predominantly conjugated diolefin monomer units;

A'-B" is a polymer block containing monoalkenyl aromatic hydrocarbon monomer units (A') and conjugated diolefin monomer units (B"), the A'-B" monomer units may be random, tapered or block and when A'-B" is block, the A' block may be the same or different from A" and B" may be the same or different from B';

x' and z' are, independently, numbers equal to 0 or 1; and y' is a number from 0 to about 15, with the proviso that the sum of $x'+y'+z \geq 1$.

The radial polymers may, then, be symmetric or asymmetric.

In the production of all of the polymers described above, if the polymerization is to be terminated, it is preferably terminated by utilizing hydrogen, deuterium or a compound which releases hydrogen upon decomposition but the conventional alcohol terminating agent may also be used. The living polymer, or more accurately, the living end of the polymer chain, is terminated by the addition of hydrogen thereto. When this improvement is used, the problems of using alcohol, i.e. the formation of lithium alkoxides and excess alcohol impurities, are avoided. However, the standard alcohol termination method can be used successfully in the present process as well as the others discussed above.

When hydrogen termination is carried out it is usually advisable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about thirty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solvent and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

The promoters (cocatalysts) which may be used include hydrocarbon lithium compounds of general formula LiR, where R denotes an alkyl or aryl group of one to twenty carbon atoms. For example, methyl lithium, ethyl lithium, propyl lithium, butyl lithium, sec-butyllithium, hexyl lithium, phenyl lithium, benzyl lithium and the like, could be used as a promoter for the organolanthanide catalysts. Also, organic aluminum compounds, organic zinc compounds and organic magnesium compounds may be used.

As stated above, the rare earth element compounds which, together with the alkali metal promoter, make up the catalyst of the present invention, are compounds of the formula

*Cp$_2$MR where *Cp is pentamethylcyclopentadiene, M is a rare earth element and R is alkyl, aryl, aralkyl or hydrogen.

The lanthanide may be any of the elements described above such as those in the lanthanide series in the Periodic Table of the Elements, i.e. Ce, Pr, Nd, Pm, Sm, Eu, Gd, Tb, Dy, Ho, Er, Tm, Yb, Lu, Sc, Y, and La. The preferred elements for use in the present invention are Sm, Ce and La because the metals are relatively inexpensive and available compared to the other rare earth elements as are the precursor compounds in preparing the actual catalyst species.

A coordination ligand of solvation is usually important because it stabilizes and allows for ease in isolation and purification of catalyst species. Tetrahydrofuran is the most generally used ligand of coordination because tetrahydrofuran is generally the solvent of catalyst preparation. However, other materials such as aluminum alkyls, lithium alkoxides, etc., may also be used. The important characteristic of the coordinating ligand is that it stabilizes the rare earth compound by coordinatively saturating the metal center.

The preferred rare earth compounds for use in the present invention include but are not limited to: *Cp$_2$Sm(CH$_3$)(THF), *Cp$_2$SmPh(THF), [*Cp$_2$SmH]$_2$, *Cp$_2$Sm(CH$_2$Ph)(THF), *Cp$_2$Sm(C$_3$H$_5$), *Cp$_2$YCH$_3$(THF), *Cp$_2$LuPh, *Cp$_2$LuMe, *Cp$_2$ScCH$_3$, *Cp$_2$ScPh, *Cp$_2$ScCH$_2$Ph, *Cp$_2$ScH, [*Cp$_2$NdH]$_2$, [*Cp$_2$LuH]$_2$, [*Cp$_2$LaH]$_2$, *Cp$_2$LA—CH(Si(CH$_3$)$_3$)$_2$, *Cp$_2$SM—CH(Si(CH$_3$)$_3$)$_2$, *Cp$_2$Nd—CH(Si(CH$_3$)$_3$)$_2$ where Ph is phenyl and (THF) indicates tetrahydrofuran as a coordinating ligand. These materials are preferred because they exhibit the most advantageous hydrogenation properties and also are most easily prepared, isolated and purified.

The catalysts and process of the present invention will selectively hydrogenate conjugated diolefins without hydrogenating alkenyl aromatic hydrocarbons to any degree. Hydrogenation percentages of greater than 50% are easily obtained using the catalysts and process of the present invention. One of the most surprising attributes of these catalysts is that they have very fast initiation rates for hydrogenation under one psig of hydrogen and at 25° C. Generally, the hydrogenation conversion is about 80% within the first five minutes of reaction at 1.3 mM metal/100 g polymer. This is much faster than prior art catalysts are able to achieve. However, after about 15 minutes, the activity levels off and, for further conversion, additional catalyst must be added. Hydrogenation conversion of 95% of greater can be achieved when more catalyst is added.

In general the hydrogenation is carried out in a suitable solvent at a temperature within the range of from about 0° C. to about 120° C., preferably about 25° C. to about 80° C., and at a hydrogen partial pressure within the range from about 0.1 psig to about 1,200 psig, preferably from about 0.1 psig to about 500 psig. Catalyst concentrations within the range from about 0.01 mM(millimoles) per 100 grams of polymer to about 20 mM per 100 grams of polymer, preferably 0.1 to 2.0 mM catalyst per 100 grams of polymer, are generally used and contacting at hydrogenation conditions is generally continued for a short period of time within the range from about 5 to about 15 minutes, but longer if 95% conversion is to be achieved. Suitable solvents for hydrogenation include, among others, n-heptane, n-pentane, tetrahydrofuran, cyclohexane, toluene, hexane, diethyl ether and benzene. Because of the small amount of catalyst present in the polymer after hydrogenation, it usually is not necessary to separate the hydrogenation catalyst and catalyst residue from the polymer. However, if separation is desired, such as when 95% conversion is required, it may be carried out using methods well known in the prior art. The hydrogenation reactions may be carried out in a batch process, or a semi-continuous process or a continuous process.

The catalysts of the present invention are prepared by using methods well known in the prior art. Generally they are prepared by reactions of the precursor chloride MCl$_3$ with sodium pentamethylcyclopentadienyl to yield *Cp$_2$MCl. These resulting materials are then reacted with suitable organolithium reagents to yield *Cp$_2$Mr type compounds. The catalysts are isolated and then redissolved in solvents consistent with that of the hydrogenation process prior to the hydrogenation reaction. Suitable catalyst preparations are described in U.S. Pat. Nos. 4,668,773, 4,716,257 and 4,801,666, herein incorporated by reference.

EXAMPLES

A typical hydrogenation run consisted of pressure transferring to a 4-liter autoclave reactor approximately 76 grams of a styrene-butadiene-styrene block copolymer (52,000 molecular weight) that had been methanol-terminated dissolved in 1,560 grams of alumina-dried cyclohexane. The reactor was then set at the temperature at which the run was to be carried out at. The polymer solution was then sparged with hydrogen or nitrogen for 20 minutes. After this sparge, sec-butyl lithium was injected into the reactor and the solution was allowed to stir for approximately 20 minutes. After this, the reactor was pressurized with hydrogen to the level at which the run was to be carried out at. Next, the catalyst, dissolved in either cyclohexane or toluene, was added. The hydrogenation reaction begins immediately upon addition of the catalyst. Throughout the hydrogenation runs, samples were drawn from the reactor at periodic intervals and the olefin conversion is obtained for each sample by NMR analysis. Most reactions were considered finished at 180 minutes.

EXAMPLE 1

To a 5% by weight polymer solution of a styrene-butadiene-styrene block copolymer (52,000 molecular weight) was added 0.01 moles of sec-butyl lithium. The solution was left to stir for 10 minutes. After this time, 0.001 moles of [*Cp$_2$SmH]$_2$, dissolved in 50 grams of toluene, was added. The reactor temperature was 25° C. and the reactor hydrogen pressure was 10 psig. At 6 minutes into the run a small exotherm was observed, causing the temperature of the reactor to rise to 26.7° C. At 13 minutes, the reactor temperature was again at 25° C. Olefin conversion at 15 minutes into the run was 46%. At 30 minutes, the olefin conversion was 59%. At 45 minutes, the olefin conversion was 61%. At 60 minutes, the temperature and pressure of the reactor were raised to 60° C. and 200 psig respectively. The final olefin conversion for the run at 180 minutes was 65%. Comparing the conversion at 45 minutes and at 180 minutes, it is observed that the reaction is essentially complete at 45 minutes.

EXAMPLE 2

To a 5% by weight polymer solution of a styrene-butadiene-styrene block copolymer (52,000 molecular weight) was added 0.01 moles of sec-butyl lithium. The solution was allowed to stir for 20 minutes. After this time, 0.001 moles of *Cp$_2$SmMe(THF) dissolved in 50 grams of toluene, was added.

The reactor temperature was 25° C. and the reactor pressure was 1 psig. At 6 minutes into the run an exotherm was observed which caused the temperature in the reactor to rise to 32° C. at 30 minutes, the rector temperature was again 25° C. Olefin conversion at 15 minutes was 53%. At 30 minutes, the olefin conversion was 75%. At 45 minutes, the olefin conversion was 78%. At 60 minutes, the temperature and pressure of the reactor were raised to 60° C. and 200 psig respectively. The final olefin conversion for the run at 180 minutes was 78%. Comparing the conversion at 45 minutes and at 180 minutes, it is observed that the reaction is essentially complete at 45 minutes.

EXAMPLE b 3

To a 5% by weight polymer solution of a styrene-butadiene-styrene block copolymer (52,000 molecular weight) was added 0.0075 moles of sec-butyl lithium. The solution was allowed to stir for 17 minutes. After this time, 0.001 moles of [*Cp$_2$mH]$_2$, dissolved in 50 grams of toluene, was added. The reactor temperature was 25° C. and the reactor pressure was 10 psig. Immediately upon addition of the catalyst to the reactor, an exotherm occurred which caused the temperature of the polymer solution to rise to 37.8° C. At 15 minutes, the reactor temperature was again 25° C. Olefin conversion at 5 minutes was 73%. At 15 minutes, olefin conversion was 75%. At 45 minutes, olefin conversion was 75%. At 60 minutes, the temperature and pressure of the reactor were raised to 60° C. and 200 psig respectively. The final olefin conversion for the run at 180 minutes was 75%.

EXAMPLE 4

To a 5% by weight polymer solution of a styrene-butadiene-styrene block copolymer (52,000 molecular weight) was added 0.0025 moles of sec-butyl lithium. The solution was allowed to stir for 10 minutes. After this time, 0.0003 moles of *Cp$_2$SmMe(THF), dissolved in 50 grams of toluene, was added. The reactor temperature was 40° C. and the reactor pressure was 80 psig. Immediately upon addition of the catalyst to the reactor, an exotherm occurred which caused the temperature of the reactor to rise to 42.5° C. At 15 minutes, the reactor temperature was again 40° C. Olefin conversion at 15 minutes was 36%. At 45 minutes, olefin conversion was 35%. At 60 minutes into the run, another 0.0003 moles of catalyst was added. Another slight exotherm was observed, raising the reactor temperature to 43° C. Olefin conversion at 90 minutes was 78%. At 124 minutes, another 0.003 moles of catalyst was added. The final olefin conversion at 180 minutes was 83%. The total catalyst added was 0.0009 moles.

EXAMPLE 5

To a 5% by weight polymer solution of a styrene-butadiene-styrene block copolymer (52,000 molecular weight) was added 0.0075 moles of sec-butyl lithium. The solution was allowed to stir for 15 minutes. After this time, 0.001 moles of [*Cp$_2$SmH]$_2$, dissolved in 125 grams of toluene, was added. The temperature of the reactor was 40° C. and the hydrogen pressure was 70 psig. Immediately upon addition of the catalyst, an exotherm occurred which caused the temperature of the reactor to rise to 48° C. After 15 minutes, the temperature was again 40° C. Olefin conversion at 5 minutes was 73%. At 15 minutes, olefin conversion was 74%. At 60 minutes olefin conversion was 74%. The final conversion at 180 minutes was 75%.

EXAMPLE 6

To a 5% by weight polymer solution of a styrene-butadiene-styrene block copolymer (52,000 molecular weight) was added 0.0075 moles of sec-butyl lithium. The solution was allowed to stir for 10 minutes. After this time, 0.001 moles of [*Cp$_2$SmH]$_2$, dissolved in 129 grams of toluene, was added. The temperature of the reactor was 60° C. and the hydrogen pressure was 500 psig. Immediately upon addition of the catalyst, an exotherm occurred which caused the temperature of the reactor to rise to 66° C. After 15 minutes, the temperature was again at 40° C. Olefin conversion at 5 minutes was 71%. After 15 minutes, olefin conversion was 72%. At 60 minutes olefin conversion was 75%. The final conversion at 180 minutes was 81%. This test stresses the rapidity of the reaction. These are very good initial rates compared to other known catalysts which have rates where the conversion is only 19.7% at 15 minutes into the reaction, such as shown in Example 12.

EXAMPLE 7

To a 5% by weight polymer solution of a styrene-butadiene-styrene block copolymer (52,000 molecular weight), was added 0.0075 moles of sec-butyl lithium. The solution was allowed to stir for 10 minutes. After this time, 0.001 moles of *Cp$_2$SmMe(THF), dissolved in 50 grams of toluene, was added. The temperature of the reactor was 40° C. and the hydrogen pressure was 70 psig. Immediately upon addition of the catalyst, an exotherm occurred which caused the temperature of the reactor to rise to 53° C. After 15 minutes, the temperature was again 40° C. Olefin conversion at 5 minutes was 77%. After 45 minutes, olefin conversion was 78%. Final conversion at 120 minutes was 78%.

EXAMPLE 8

To a 5% by weight polymer solution of a styrene-butadiene-styrene block copolymer (52,000 molecular weight) was added 0.0025 moles of sec-butyl lithium. The solution was allowed to stir for 10 minutes. After this time, 0.007 moles of *Cp$_2$SmPh(THF), dissolved in 50 grams of toluene, was added. The temperature of the reactor was 40° C. and the hydrogen pressure of the reactor was 200 psig. Immediately upon addition of the catalyst, an exotherm occurred which caused the temperature of the reactor to rise to 50° C. After 15 minutes, the temperature was again 40° C. Olefin conversion at 15 minutes was 77%. After 60 minutes, olefin conversion was 77%. At 120 minutes, the temperature and pressure of the reactor were raised to 80° C. and 500 psig, respectively. The final conversion at 210 minutes was 81%.

EXAMPLE 9

To a 5% by weight polymer solution of a styrene-butadiene-styrene block copolymer (52,000 molecular weight) was added 0.0025 moles of sec-butyl lithium. The solution was allowed to stir for 10 minutes. After this time, 0.001 moles of *Cp$_2$Sm(C$_3$H$_5$), dissolved in 56 grams of toluene, was added. The temperature of the reactor wa 40° C. and the hydrogen pressure was 500 psig. Immediately upon addition of the catalyst, an exotherm occurred which caused the temperature of the reactor to rise to 55° C. After 15 minutes, the temperature was again 40° C. Olefin conversion at 5 minutes was 77%. At 30 minutes, olefin conversion was 78%. At 90 minutes, the temperature and the pressure of the reactor were raised to 80° C. and 700 psig respectively. The final conversion at 180 minutes was 83%.

EXAMPLE 10

To a 15% by weight polymer solution of a styrene-butadiene-styrene block copolymer (52,000 molecular weight) was added 0.0025 moles of sec-butyl lithium. The solution was allowed to stir for 10 minutes. After this time, 0.001 moles of *Cp$_2$Sm(C$_3$H$_5$), dissolved in 51 grams of toluene, was added. The temperature of the reactor was 40° C. and the hydrogen pressure was 500 psig. Immediately upon addition of the catalyst, an exotherm occurred which caused the temperature of the reactor to rise to 76° C. After 20 minutes, the temperature was again 40° C. Olefin conversion at 5 minutes was 66%. At 30 minutes, olefin conversion was 68%. The final conversion at 180 minutes was 68%.

EXAMPLE 11

To a 5% by weight polymer solution of a styrene-butadiene-styrene block copolymer (52,000 molecular weight) that had been hydrogen terminated was added 0.00025 moles of sec-butyl lithium. The solution was allowed to stir for 5 minutes. After this time, 0.001 moles of [*Cp$_2$SmH]$_2$, dissolved in 31 grams of toluene, was added. The reactor temperature was 40° C. and the hydrogen pressure was 500 psig. Immediately upon addition of the catalyst, an exotherm occurred which caused the temperature of the reactor to rise to 62° C. After 20 minutes the temperature was again 40° C. Olefin conversion at 15 minutes was 77%. At 60 minutes, olefin conversion was 77%. The final conversion at 150 minutes was 77%.

EXAMPLE 12 (COMPARATIVE EXAMPLE)

To a 5% by weight polymer solution of a styrene-butadiene-styrene block copolymer (52,000 molecular weight) was added 0.0075 moles of sec-butyl lithium. The solution was allowed to stir for 11 minutes. After this time, 0.0025 moles of Cp$_2$TiCl$_2$ (where Cp is cyclopentadienyl), dissolved in 110 grams of toluene, was added. The reactor temperature was 40° C. and the hydrogen pressure was 70 psig. There was no exotherm observed upon addition of the catalyst. Olefin conversion at 15 minutes was 20%, much lower than the rates in other examples. At 30 minutes was 52%. The final conversion at 90 minutes was 98%.

EXAMPLE 13

To a 5% by weight polymer solution of a styrene-butadiene-styrene block copolymer (52,000 molecular weight) was added 0.015 g-moles of sec-butyllithium. The solution was allowed to stir for 10 minutes. After this time, 0.005 g-moles of *Cp$_2$SmMe(THF) dissolved in 50 grams of toluene was added. The reactor temperature was 25° C. and the reactor pressure was 10 psig. At 2 minutes into the run an exotherm was observed which caused the temperature in the reactor to rise to 25.4° C. and then return to 25° C. after 5 minutes. Olefin conversion at 75 minutes was 22.3%. At 85 minutes into the run, a second charge of catalyst (0.005 g-moles in 50 grams of toluene) was added to the reactor. Within 2 minutes of the second catalyst addition, the temperature reached 31.6° C. The temperature returned to 25° C. after 27 minutes. At 115 minutes into the run, the temperature was raised to 40°C. Olefin conversion at 130 minutes was 81.8%. At 175 minutes into the run, the temperature was reduced to 25° C. and a third catalyst charge of 0.005 g-moles was added to the reactor. Within 2 minutes, the reactor reached 26.1° C., then returned to 25° C. after 5 minutes. Final olefin conversion for the run at 235 minutes was 95.2%.

EXAMPLES 14-17

A typical hydrogenation run consisted of pressure transferring to a 600 ml stirred, pressurized reactor approximately 300 g of a 5% of 20% by weight polymer in cyclohexane solution. The polymer was a hydrogen-terminated styrene-butadiene-styrene block copolymer of 25,300 molecular weight. The reactor temperature was then controlled to the setpoint temperature and the mixer turned on. The reactor vent was closed and the reactor was allowed to pressurize to the appropriate pressure with hydrogen. Next, the catalyst in cyclohexane was added to the reactor. The hydrogenation reaction began immediately upon addition of the catalyst. Additional catalyst charges were sometimes added throughout the run. Samples were drawn from the reactor at periodic intervals and the olefin conversion was obtained for each sample.

EXAMPLE 14

To a 5% by weight polymer solution of styrene-butadiene-styrene block copolymer of 52,300 molecular weight 0.000191 g-moles of *Cp$_2$SmMe(THF) dissolved in 25 grams of cyclohexane was added. The reactor temperature of 40° C. and the reactor pressure of 70 psig were held constant throughout the entire run. At 30 minutes into the run, the olefin conversion was 77.3%. After the 30 minute sample was taken, an additional 0.000191 g-moles of the catalyst dissolved in 25 grams of cyclohexane was added to the reactor. At 60 minutes into the run, a third charge of catalyst (0.000191 g-moles) was added to the reactor. At 90 minutes into the run, the olefin conversion was 81.9%. After the 90 minute sample was taken, a final charge of catalyst (0.000191 g-moles) was added to the reactor. The final olefin conversion for the run at 150 minutes was 86.1%.

EXAMPLE 15

To a 20% by weight polymer solution of styrene-butadiene-styrene block copolymer of 52,300 molecular weight 0.000383 g-moles of [*Cp$_2$SmH]$_2$ dissolved in 25 grams of cyclohexane was added. The reactor temperature was 25° C. and the reactor pressure was 10 psig. At 30 minutes into the run, the olefin conversion was 27.2%. At 60 minutes into the run, the reactor temperature was raised to 70° C. and the reactor pressure to 120 psig. Final olefin conversion for the run at 120 minutes was 71.6%.

EXAMPLE 16

To a 5% weight polymer solution of styrene-butadiene-styrene block copolymer of 52,300 molecular weight 0.000096 g-moles of [*Cp$_2$SmH]$_2$ dissolved in 25 grams of cyclohexane was added. The reactor temperature of 40° C. and the reactor pressure of 70 psig were held constant through out the entire run. At 30 minutes into the run, the olefin conversion was 72.9%. After the 30 minute sample was taken, an additional 0.000096 g-moles of the catalyst dissolved in 25 grams of cyclohexane was added to the reactor. At 60 minutes into the run, a third charge of catalyst (0.000096 g-moles) was added to the reactor. At 90 minutes into the run, a final charge of catalyst (0.000096 g-moles) was added to the reactor. The final olefin conversion for the run at 120 minutes was 87.9%.

EXAMPLE 17

To a 5% by weight polymer solution of styrene-butadiene-styrene block copolymer of 52,300 molecular weight 0.0003 g-moles of [*Cp$_2$SmH]$_2$ dissolved in 25 grams of cyclohexane was added. The reactor temperature of 40° C. and the reactor pressure of 70 psig were held constant throughout the entire run. At 30 minutes into the run, the olefin conversion was 73.4%. After the 30 minute sample was taken, an additional 0.0003 g-moles of the catalyst dissolved in 25 minutes was 83.9%. At 60 minutes into the run, a third charge of catalyst (0.0003 g-moles) was added to the reactor. The final olefin conversion for the run at 90 minutes was 91.1%.

We claim:

1. A process for the selective hydrogenation of the unsaturated double bonds in the conjugated diolefin units of polymers containing said diolefin units, said process comprising hydrogenating said polymers in the presence of hydrogen and a catalyst comprising an alkali metal promoter and a rare earth compound of the formula:

*Cp$_2$MR where R is selected from the group consisting of alkyl, aryl, aralkyl or hydrogen, *Cp is pentamethylcyclopentadiene and M is a rare earth element.

2. The process of claim 1 wherein M is selected from the group consisting of Sm, Ce and Le.

3. The process of claim 1 wherein the catalyst also comprises a coordinating ligand of solvation.

4. The process of claim 1 wherein the rare earth compound is selected from the group consisting of *Cp$_2$Sm(CH$_3$)(THF), *Cp$_2$SmPh(THF), [*Cp$_2$SmH]$_2$, *Cp$_2$Sm(CH$_2$Ph)(THF), *Cp$_2$Sm(C$_3$H$_5$), *Cp$_2$YCH$_3$(THF), *Cp$_2$LuPh, *Cp$_2$LuMe, *Cp$_2$ScCH$_3$, *Cp$_2$ScPh, *Cp$_2$ScCH$_2$Ph, *Cp$_2$ScH, [*Cp$_2$NdH]$_2$, [*Cp$_2$LuH]$_2$, [*Cp$_2$LaH]$_2$, *Cp$_2$LA—CH(Si(CH$_3$)$_3$)$_2$, *Cp$_2$SM—CH(Si(CH$_3$)$_3$)$_2$, *Cp$_2$Nd—CH(Si(CH$_3$)$_3$)$_2$ where Ph is phenyl and (THF) indicates tetrahydrofuran as a coordinating ligand of solvation.

5. A process for the hydrogenation of conjugated diolefin polymers which comprises:
   (a) polymerizing or copolymerizing at least one conjugated diolefin with an organo-alkali metal polymerization initiator in a suitable solvent thereby creating a living polymer, and
   (b) effecting selective hydrogenation of the unsaturated double bonds in the conjugated diolefin units of said terminated polymer by contacting the polymer with hydrogen in the presence of a catalyst comprising an alkali metal promoter and a rare earth compound of the formula:

*Cp$_2$MR where R is selected from the group consisting of alkyl, aryl, halogen or hydrogen, *Cp is pentamethylcyclopentadiene and M is a rare earth element.

6. The process of claim 5 wherein M is selected from the group consisting of Sm, Ce, and La.

7. The process of claim 5 wherein the catalyst also comprises a coordinating ligand of solvation.

8. The process of claim 5 wherein the organolanthanide compound is selected from the group consisting of *Cp$_2$Sm(CH$_3$)(THF), *CP$_2$SmPh(THF), [*Cp$_2$SmH]$_2$, *Cp$_2$Sm(CH$_2$Ph)(THF), *Cp$_2$Sm(C$_3$H$_5$), *Cp$_2$YCH$_3$THF), *Cp$_2$LuPh, *Cp$_2$LuMe, *Cp$_2$ScCh$_3$, *Cp$_2$ScPh, *Cp$_2$ScH, [*Cp$_2$NdH]$_2$, [*Cp$_2$LuH]$_2$, [*Cp$_2$LaH]$_2$, *Cp$_2$La—CH(Si(CH$_3$)$_3$)$_2$, *Cp$_2$Sm—CH(Si(CH$_3$)$_3$)$_2$, *Cp$_2$Nd—CH(Si(CH$_3$)$_3$)$_2$ where Ph is phenyl and (THF) indicates tetrahydrofuran as a coordinating ligand of solvation.

9. The process of claim 1 wherein a diolefin is copolymerized with at least one alkenyl aromatic hydrocarbon.

10. The process of claim 5 wherein a diolefin is copolymerized with at least one alkenyl aromatic hydrocarbon.

11. The process of claim 1 wherein a diolefin selected from the group consisting of butadiene and isoprene is copolymerized with styrene.

12. The process of claim 1 wherein a diolefin selected from the group consisting of butadiene and isoprene is copolymerized with styrene.

13. The process of claim 1 wherein the diolefin is selected from the group consisting of butadiene and isoprene.

14. The process of claim 5 wherein the diolefin is selected from the group consisting of butadiene and isoprene.

15. The process of claim 1 wherein the hydrogenation is carried out at a temperature from about 0° to about 120° C. and a pressure of from about 0.1 psig to about 1,200 psig and the catalyst concentration is from about 0.01 mM to about 20 mM of catalyst per 100 g of polymer.

16. The process of claim 5 wherein the hydrogenation is carried out at a temperature from about 0° to about 120° C. and a pressure of from about 0.1 psig to about 1,200 psig and the catalyst concentration is from about 0.01 mM to about 20 mM of catalyst per 100 g of polymer.

17. The process of claim 1 wherein the promoter is an organolithium compound.

18. The process of claim 5 wherein the promoter is an organolithium compound.

19. The process of claim 1 wherein the promoter is sec-butyl lithium.

20. The process of claim 5 wherein the promoter is sec-butyl lithium.

* * * * *